United States Patent
Hirota

(10) Patent No.: US 6,416,129 B1
(45) Date of Patent: Jul. 9, 2002

(54) CHILD SEAT ANCHORING STRUCTURE

(75) Inventor: Toshio Hirota, Atsugi (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/843,097

(22) Filed: Apr. 27, 2001

(30) Foreign Application Priority Data

Jun. 26, 2000 (JP) ........................................ 2000-191278

(51) Int. Cl.[7] .................................................. A47D 1/10
(52) U.S. Cl. ..................................... 297/253; 297/250.1
(58) Field of Search .............................. 297/253, 250.1, 297/254, 485, 482

(56) References Cited

U.S. PATENT DOCUMENTS 5,487,588 A * 1/1996 Burleigh et al. ......... 297/253 X
5,941,601 A * 8/1999 Scott et al. ................. 297/253
5,971,479 A * 10/1999 Jacquemot et al. ......... 297/254

OTHER PUBLICATIONS

US 6,299,957, 04/2001, Baloga et al. (withdrawn)*.

* cited by examiner

Primary Examiner—Anthony D. Barfield
(74) Attorney, Agent, or Firm—Shinjyu Global IP Counselors, LLP

(57) ABSTRACT

A child seat anchoring structure is provided that can prevent the seat belt webbing from getting caught in the components that secure the child seat to the vehicle. The child seat anchoring structure has child seat attachment part in which a child seat is installed by moving a locking part of the child seat from the forward direction of the vehicle so that the locking part approaches the rod-shaped attachment part of a child seat fixing striker that is mounted close to a seat belt anchor to which the webbing is fixed. The structure is provided with a webbing guide bar part that prevents the webbing from entering the region between the rod-shaped attachment part and the locking part of the child seat.

15 Claims, 6 Drawing Sheets

CHILD SEAT ANCHORING STRUCTURE

BACKGROUND OF THE INVENTION

1. Field of the Invention

The present invention generally relates to installing a child seat in a vehicle. More specifically, the present invention relates a child seat anchoring structure that prevents the seat belt webbing from getting caught during installation of a child seat into a vehicle.

2. Background Information

Many vehicles have vehicle child seat anchors for installing a child seat therein. These child seat anchors are typically located between a seat cushion part and a seat back part in the area of the seat belt anchors. The seat cushion part of the seat extends generally in a horizontal direction relative to the vehicle. The seat back part of the seat extends generally upright from the vicinity of the rear end edge of the seat cushion part. The seat belt anchors are used to fix the end parts of the seat belt webbings to the vehicle body. The seat belt anchors are typically fixed to the floor panel of the vehicle by a bolt or the like. The seat belt anchors are positioned between the rear end part of the seat cushion part and the lower end edge of seat back part. The webbing is drawn out from between the rear end edge of the seat cushion part and the lower end edge of seat back part.

The child seat anchors have a child seat fixing striker that is typically provided separately from the seat belt anchor for installing a child seat on the vehicle seat. The child seat fixing striker is fixed to the floor panel between the rear end part and the lower end part. The child seat fixing striker is provided with a mounting part that is fixed to the floor panel by means of a bolt or the like. The child seat fixing striker is also-provided with a generally gate-shaped striker body that is coupled integrally with the mounting part and serves as the attachment part that fits together with the slot of the locking part of the child seat.

Next, the operation of the above described child seat anchor is explained. In most cases, the child seat is placed on the upper surface of the seat cushion and the child seat locking part is moved toward the striker body of the child seat fixing striker from the forward direction of the vehicle towards the rear end of the vehicle. As a result, the slot fits together with the striker body. The lower surface part and back surface part of the child seat are in contact with and fixed to the upper surface part of the seat cushion part of the seat part and the surface of the seat back that faces the cabin interior. With this kind of conventional child seat anchor, there is the risk that webbing will get caught in the slot of the child seat locking part. Specifically, if webbing is located in the area between the slot and the portion of the striker body facing the front of the vehicle when the child seat is being installed, then the webbing will get caught in the slot of the child seat locking part.

One method to avoid this problem might be to form a slit in the seat cushion part to provide a detour path for the seat belt. However, this method could potentially increase manufacturing costs because separate slits must be formed in the seat cushion part in order to provide such detour paths for the seat belts.

In view of the above, there exists a need for a child anchoring structure which overcomes the above mentioned problems in the prior art. This invention addresses this need in the prior art as well as other needs, which will become apparent to those skilled in the art from this disclosure.

SUMMARY OF THE INVENTION

One object of the present invention is to provide an inexpensive child seat anchoring structure capable of preventing the seat belt webbing from getting caught when installing a child seat into a vehicle as previously described.

This object is basically attained by providing a child seat anchoring structure for installing a child seat into a vehicle body. The child seat anchoring structure basically comprises a seat belt-anchor, a child seat attachment part and a webbing guide part. The seat belt anchor is adapted to have the webbing of a seat belt fixed thereto. The child seat attachment part mounted adjacent said seat belt anchor. The child seat attachment part is arranged to receive a locking part of the child seat by moving the child seat in a generally backward direction of the vehicle so that the locking part approaches the child seat attachment part. The webbing guide part is arranged to prevent the webbing from entering a region in front of the child seat attachment part in which the locking part of the child seat is received.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

First Embodiment

Figure 1:
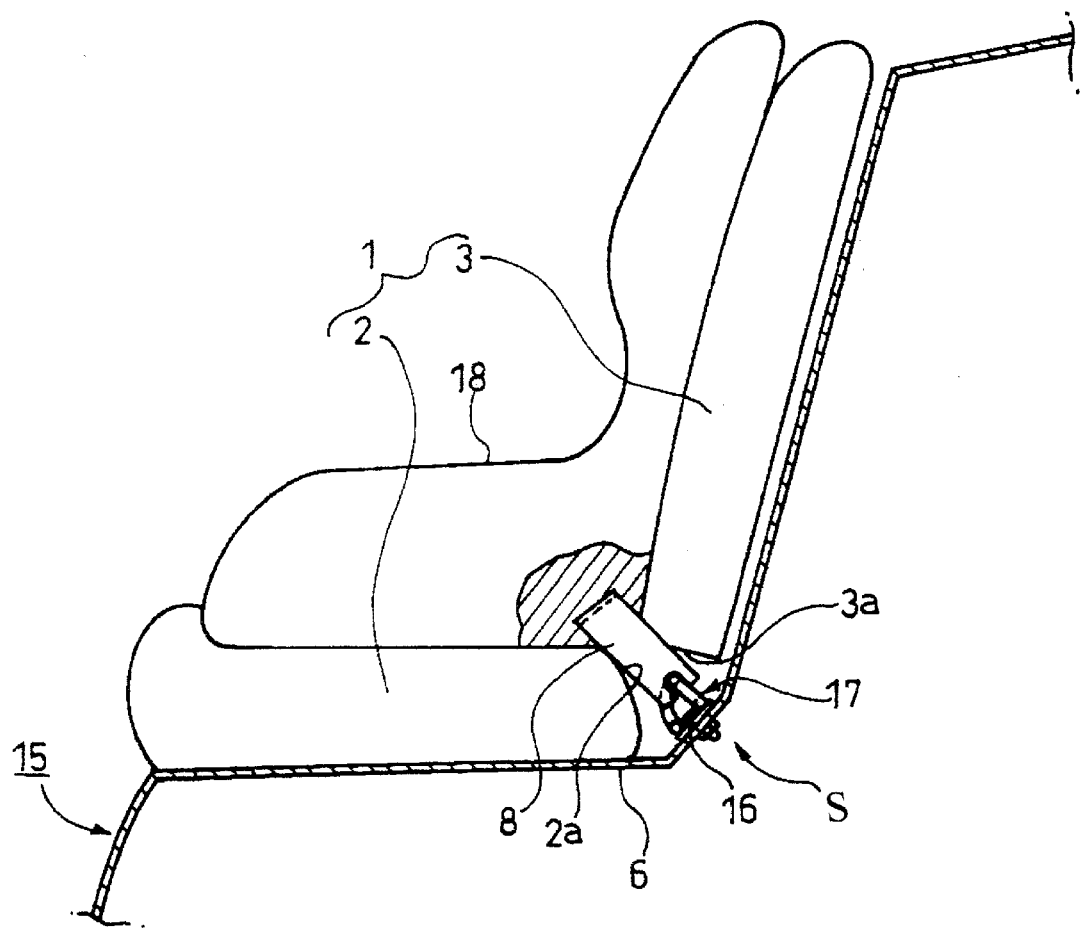
FIG. 1 is a diagrammatic side elevational view of a vehicle seat with a child seat anchoring structure in accordance with a first embodiment of the present invention coupled to the vehicle body, which is shown in cross section.
Figure 2:
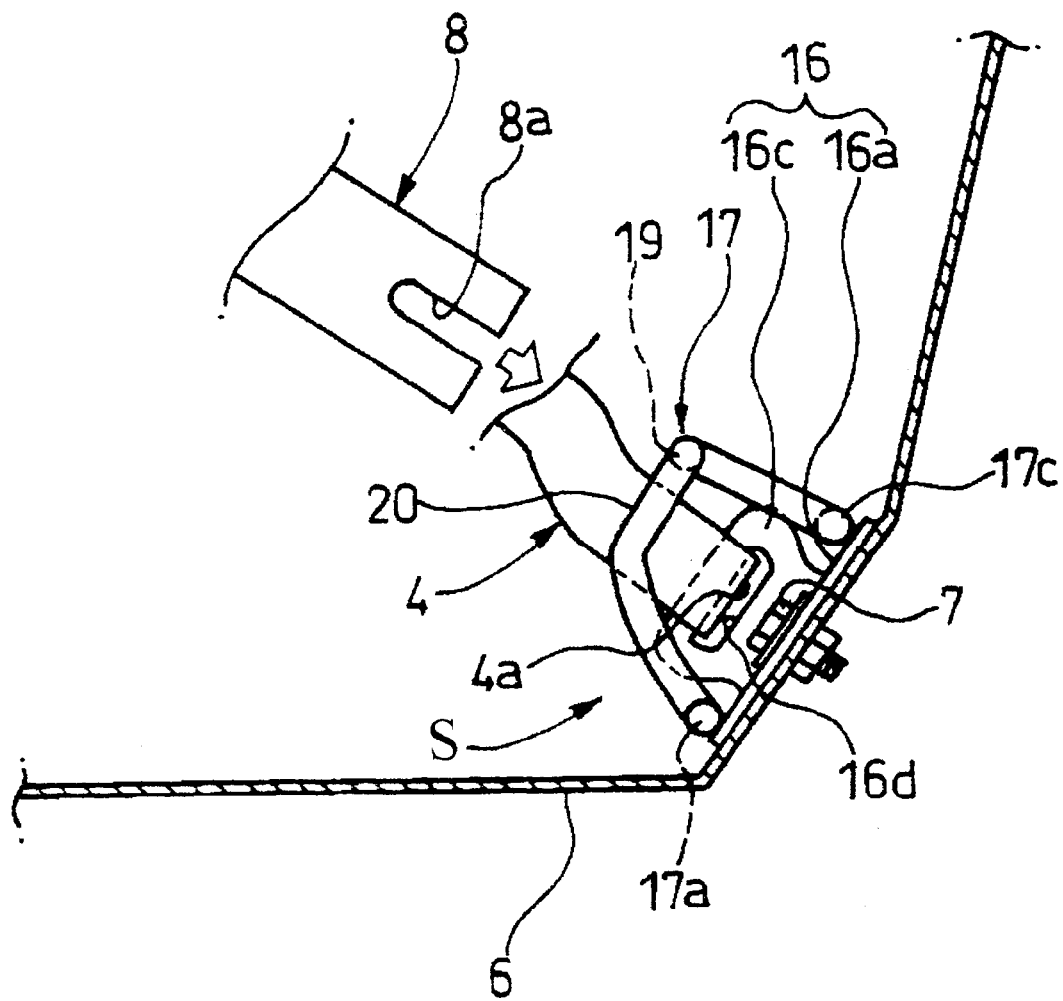
FIG. 2 is an enlarged side elevational view of selected parts of the child seat anchoring structure of the first embodiment just prior to the child seat being installed in the child seat anchoring structure.
Figure 3:
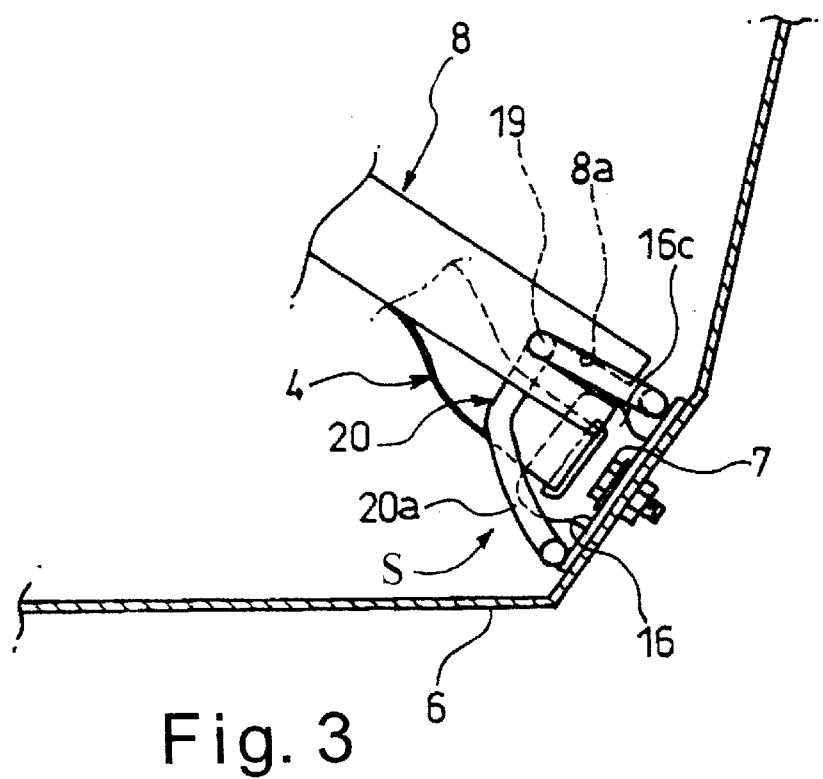
FIG. 3 is an enlarged side elevational view of selected parts of the child seat anchoring structure of the first embodiment just after to the child seat has been installed in the child seat anchoring structure.
Figure 4:
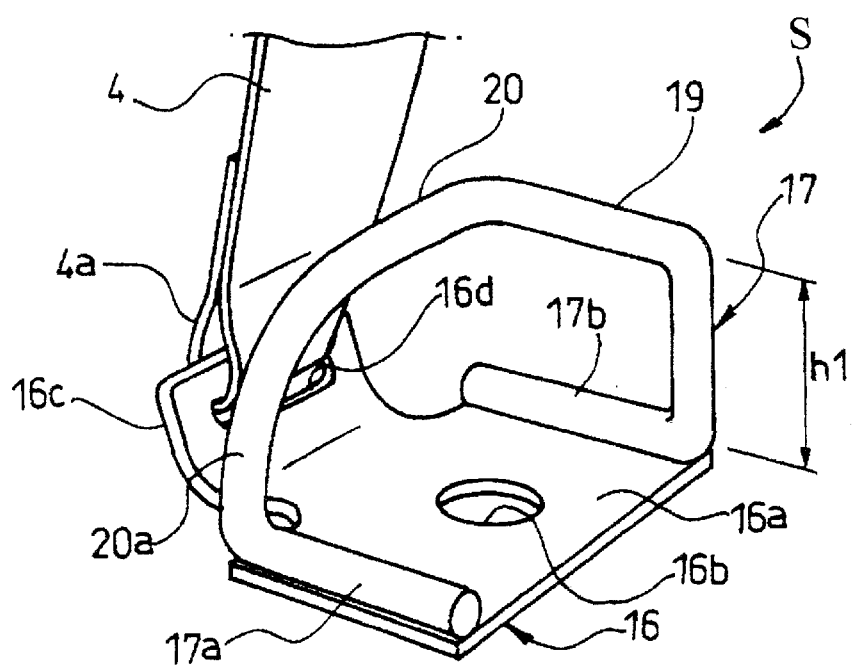
FIG. 4 is a perspective view of the seat belt anchor located on the left side of the seat part in the child seat anchoring structure of the first embodiment.
Figure 5:
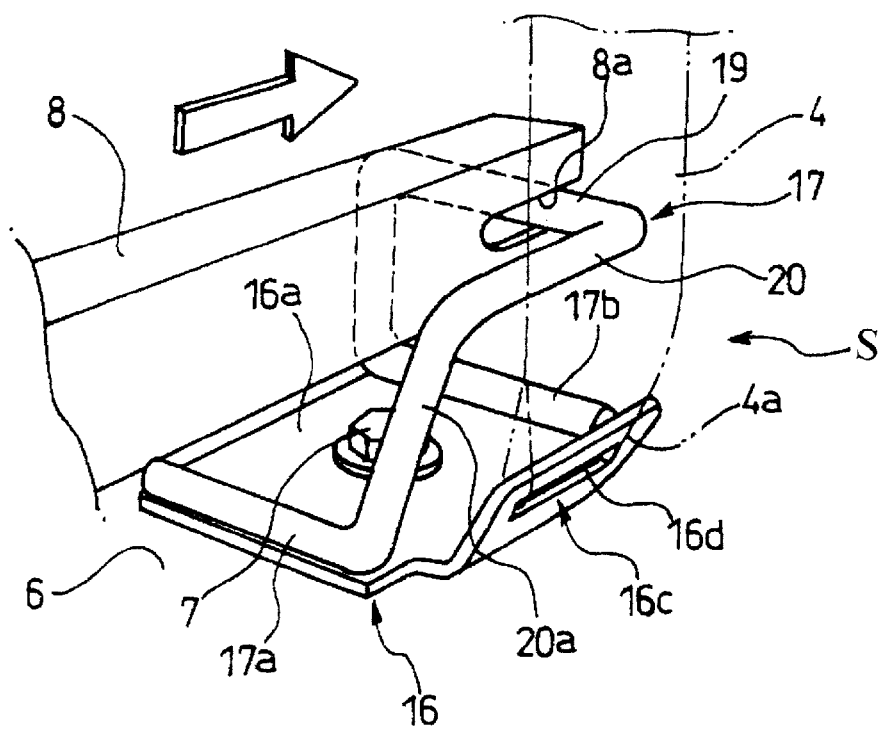
FIG. 5 is a perspective view of the seat belt anchor located on the right side of the seat part in the child seat anchoring structure of the first embodiment to show how the child seat locking part fits onto the child seat fixing striker.

Referring initially to FIGS. 1–5, a pair of child seat anchoring structures S are illustrated in accordance with a first embodiment of the present invention. The left child seat anchoring structure S is shown in FIGS. 1–4, while the right child seat anchoring structure S is shown in FIG. 5. The left and right child seat anchoring structures S are preferably mirror images of each other. Of course, alternatively, the left and right child seat anchoring structures can be identical to each other or be somewhat different as needed and/or desired. As seen in FIGS. 1 and 2, a child seat 18 is installed on a vehicle seat 1 by a pair of child seat anchoring structures S (only one shown in FIGS. 1 and 2). In other words, the child seat 18 has a pair of installation portions or locking parts 8 that are each equipped with a conventional locking mechanism (not shown) that conforms a predetermined standard such as the ISOFIX child seat system or other a predetermined standard. The ISOFIX child seat system is a model child restraint attachment system proposed by the United Nation Economic Commissions for Europe. An ISOFIX-compliant child restraint attachment system includes two lower anchors. The lower anchors are located in the seat bight line, which is a region of intersection of the surfaces of the seat cushion and the seat back. The ISOFIX standards are well known in the art. Therefore, explanation of the ISOFIX standards will be omitted herein. For the sake of simplicity, the locking parts 8 of the child seat 18 will only be illustrated in a simple form. In other words, only a slot 8a of the child seat locking part 8 will be illustrated.

Basically, as seen in FIG. 1, the vehicle seat 1 of the vehicle 15 has a seat cushion part 2 and a seat back part 3. The seat cushion part 2 extends generally horizontally. The seat back part 3 extends generally upward from the vicinity of the rear end edge 2a of the seat cushion part 2. Two seat belt anchors 16 are provided with respect to each seating portion of the seat 1. As seen in FIG. 1, each seat belt anchor 16 serves as a bracket used to fix the end part 4a of the seat belt webbing 4 to the vehicle body or floor panel 6. The seat belt anchors 16 are provided on the left and right in a generally symmetrical arrangement.

Each seat belt anchor 16 is provided with a mounting plate or member 16a that is fixed to the floor panel 6, which is positioned between the rear end edge 2a and the lower end edge 3a of the seat back part 3. The approximate center of the mounting plate 16a is provided with a bolt hole 16b for the passing bolt 7. One of the transversely facing edges of the mounting plate 16a is integrally provided with an upwardly bent seat belt anchor part 16c. A slit 16d is formed in the seat belt anchor part 16c for receiving the end part 4a of the seat belt webbing 4 therein. The slit 16d has a lengthwise direction that extends in a generally forward to aft direction of the vehicle. In other words, the slit 16d is generally aligned with the longitudinal direction of the vehicle 15. The end part 4a of the seat belt webbing 4 passes through, and is looped around the slit 16d, and thus, fixed to this slit 16d. The reminder of the webbing 4 is then drawn out from between the rear end edge 2a and the lower end edge 3a of the seat 1.

A child seat fixing striker 17 is permanently affixed to the mounting plate 16a. The slot 8a of the child seat locking part 8 is moved from the forward direction of the vehicle so as to approach and mate with this child seat fixing striker 17. The front and rear fixing parts 17a and 17b of the child seat fixing striker 17 are bent so that their lengthwise directions extends in a transverse (substantially perpendicular) direction relative to the longitudinal direction of the vehicle 15. Preferably, the front and rear fixing parts 17a and 17b are welded to the vicinity of the front and rear edges of the mounting plate 16a so as to form a pre-integrated subassembly. Thus, the child seat anchoring structure S includes both the seat belt anchor 16 and the child seat fixing striker 17.

A rod-shaped attachment part 19 is provided as an attachment part on the child seat fixing striker 17. The rod-shaped attachment part 19 is positioned at a prescribed height "h1" above rear fixing part 17b (which is fixed to the vehicle body). The rod-shaped attachment part 19 is provided so that its lengthwise direction is aligned with the transverse (substantially perpendicular) direction relative to the longitudinal direction of the vehicle. The rod-shaped attachment part 19 is arranged so that when the child seat 18 is attached to the vehicle seat 1, the slot 8a approaches the child seat fixing striker 17 from the forward direction to the rearward direction of the vehicle and fits thereto, thus securing the child seat locking part 8 to the vehicle 15.

A curved webbing guide part 20, which serves as the wrap prevention means, is provided integrally between the rod-shaped attachment part 19 and the front fixing part 17a. The webbing guide part 20 is coupled integrally with one end of the rod-shaped attachment part 19 and bent toward the front of the vehicle. Thus, the webbing guide part 20 is positioned laterally between the seat belt anchor part 16c and the rod-shaped attachment part 19 of the child seat fixing striker 17 such that the seat belt webbing 4 is prevented from being located in the region in front of the rod-shaped attachment part 19. The front end part 20a of the webbing guide part 20 is curved downward so that tip part is connected to the front fixing part 17a. As seen in FIG. 4, the child seat fixing striker 17 and the curved webbing guide part 20 are formed from a single, one-piece bar or rod.

Next, the operation of the first embodiment is described. With the child seat anchoring structures of the first embodiment, the webbing guide part 20 (which serves as the wrap prevention means) prevents the webbing 4 from entering the region between the rod-shaped attachment part 19 of the child seat fixing striker 17 and the slot 8a of the child seat locking part 8 during installation of the child seat 18. As a result, the seat belt the webbing 4 is prevented from getting caught therebetween. The webbing guide part 20 is preferably integral formed with and extends from the rod-shaped attachment part 19 to bend towards the front end of the vehicle 15. As a result, an inexpensive child seat anchoring structure can be provided without increasing the number of components or the cost of manufacturing. Also, since the child seat fixing striker 17 is sub-assembled so as to be integrated with seat belt anchor 16 in advance, the installations of both the seat belt anchor 16 and the child seat fixing striker 17 are completed when the seat belt anchor 16 is mounted to the vehicle body or the floor panel 6 using the bolt 7 or the like. As a result, a child seat anchoring structure S that is easily mounted to the vehicle body can be provided without increasing the number of assembly steps.

First Variation of First Embodiment

Figure 6:
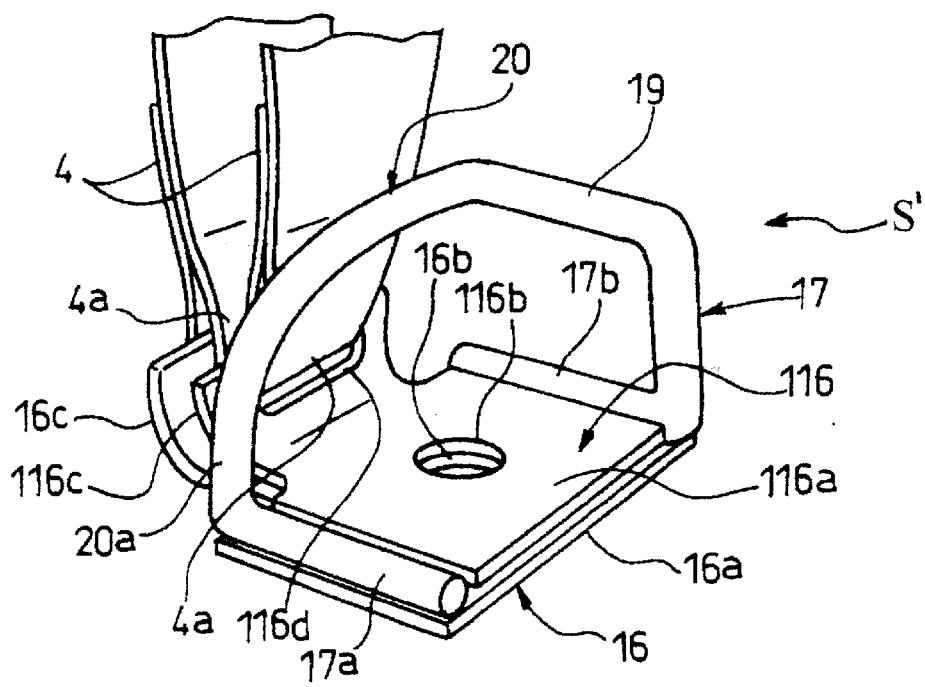
FIG. 6 is a perspective view of a modified seat belt anchor for a child seat anchoring structure in accordance with of first variation of the first embodiment.

FIG. 6 shows a first variation (child seat anchoring structure S') of the first embodiment of the present invention.

Parts that are identical or equivalent to those in the previously described the first embodiment are indicated with the same reference symbols.

In the first variation, an inner seat belt anchor 116 has been added to the child seat anchoring structure S of the first embodiment such that the child seat anchoring structure S' has a pair of seat belt anchors. Specifically, the inner seat belt anchor 116 is provided in such a manner that the mounting plate or member 116a overlies the mounting plate 16a of seat belt anchor 16. A bolt hole 116b is provided at the approximate center of the mounting plate 116a for the passing bolt 7 therethrough. An upwardly bent seat belt anchor part 116c is integrally provided on one transversely facing edge of the mounting plate 116a. A slit 116d is formed in seat belt anchor part 116c with lengthwise direction substantially aligned with the longitudinal direction of the vehicle. End part 4a of the seat belt webbing 4 passes through this slit 116d. With the child seat anchoring structure of the first variation, the webbing guide part 20 prevents the seat belt webbing 4 from entering the region between the slot 8a and the rod-shaped attachment part 19 of the child seat fixing striker 17 during installation of the child seat 18. The other constituent features and operational effects are identical or equivalent to those of the first embodiment, and therefore, their explanation is omitted here.

Second Variation of First Embodiment

Figure 7:
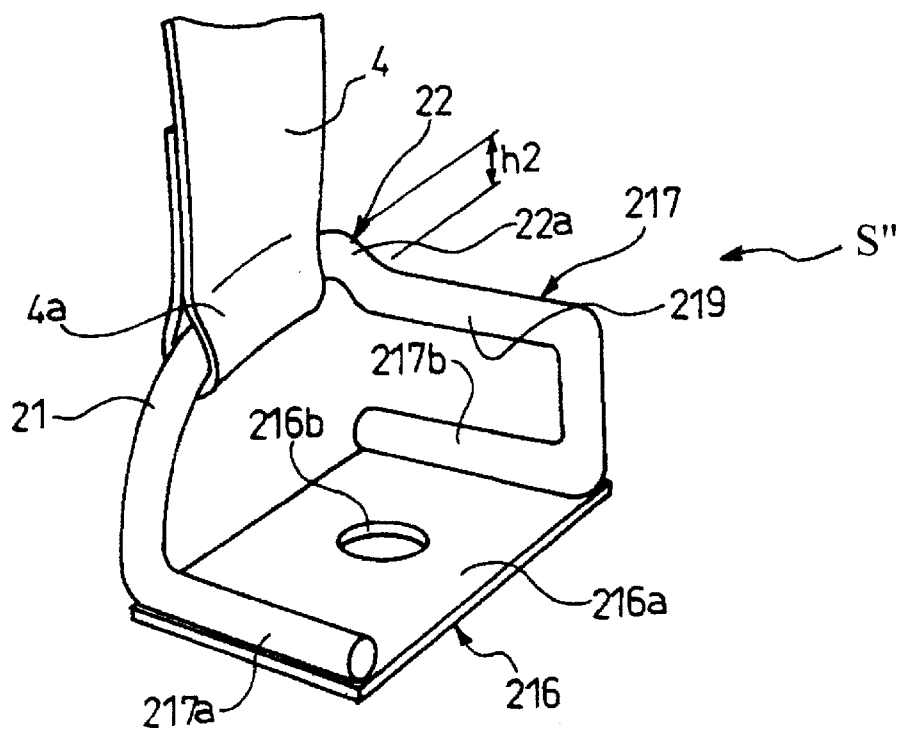
FIG. 7 is a perspective view of a modified seat belt anchor for a child seat anchoring structure in accordance with of second variation of the first embodiment.

FIG. 7 shows a second variation (child seat anchoring structure S") of the first embodiment of the present invention. Parts that are identical or equivalent to those in the previously described the first embodiment are indicated with the same reference symbols. In the second variation (child seat anchoring structure S"), the child seat fixing striker 217 and the seat belt anchor part 21 are both formed from a single, one-piece rod or bar that is affixed to a mounting plate 216a. The front and rear fixing parts 217a and 217b of the seat belt anchor part 21 and the child seat fixing striker 217 are welded to the vicinity of the front and rear edges of the mounting plate 216a. The front and rear fixing parts 217a and 217b have their lengthwise directions extending in the transverse (substantially perpendicular) direction relative to the longitudinal direction of the vehicle. A bolt hole 216b is provided at the approximate center of the mounting plate 216a for the passing bolt 7. Thus, the seat belt anchor part 21 together with the mounting plate 216a forms the seat belt anchor 216.

A rod-shaped attachment part 219 is provided on the child seat fixing striker 217 as an attachment part that extends in the transverse (substantially perpendicular) direction relative to the longitudinal direction of the vehicle. The rod-shaped attachment part 216 is separated vertically by a prescribed height from rear fixing part 217b (which is fixed to the vehicle body). The wrap prevention means of the second variation is the seat belt anchor part 21 that forms a webbing attachment rod-shaped part. Preferably, the seat belt anchor part 21 is integrally formed with and extends from the rod-shaped attachment part 219 towards the front end of the vehicle. The bent part 22 is provided between the rod-shaped attachment part 219 and the seat belt anchor part 21. A webbing movement preventing step part 22a is provided in the vicinity of bent part 22 so that there is a difference in height between the rod shaped attachment part 219 and the seat belt anchor part 21. Furthermore, the seat belt anchor part 21 is positioned higher than the rod-shaped attachment part 219 by height h2. Next, the operation of the child seat anchoring structure of the second variation is explained.

With the child seat anchoring structure of the second variation, the seat belt anchor part 21 (which serves as the wrap prevention means) is integrally formed with and extend from the rod-shaped attachment part 219 toward the front end of the vehicle. Since the end part 4a of the webbing 4 is fixed to the seat belt anchor part 21, the seat-belt anchor part 21 also serves as the webbing fixing part.

Since the end part 4a of the seat belt webbing 4 is fixed to the seat belt anchor part 21, there is no danger of the webbing 4 entering the region between rod-shaped attachment part 219 and the child seat locking part 8. As a result, since the separately provided seat belt webbing fixing part can be eliminated, an inexpensive child seat anchoring structure that prevents the webbing 4 from getting caught can be provided without increasing the number of components. Also, the webbing movement preventing step part 22a provided in bent part 22 prevents the seat belt webbing 4 from moving toward rod-shaped attachment part 219. Thus, the webbing 4 can be prevented from getting caught even if rod shaped attachment part 219 and the seat belt anchor part 21 are formed integrally by bending a single piece of rod-shaped material at bent part 22. As a result, there is no risk of increasing the number of components. Also, since the seat belt anchor part 21 is positioned higher than striker attachment part 219 by height "h2", the risk of the webbing 4 getting caught is even further reduced. The other constituent features and operational effects are identical or equivalent to those of the first embodiment, and therefore, their explanation is omitted here.

Second Embodiment

Figure 8:
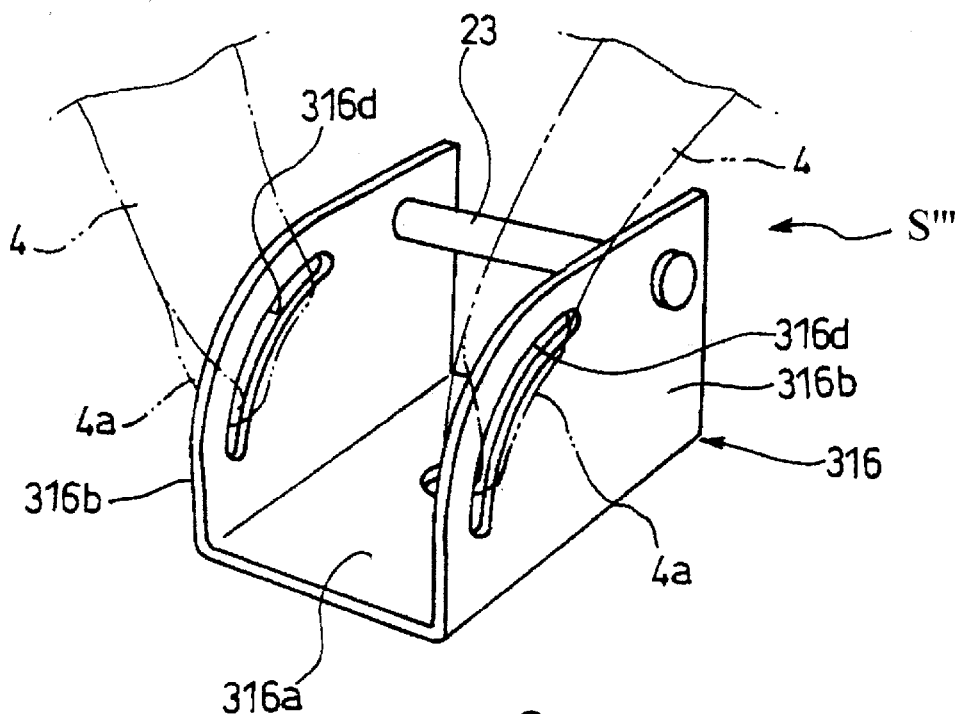
FIG. 8 is a perspective view of a modified seat belt anchor for a child seat anchoring structure in accordance with a second embodiment.

Referring now to FIG. 8, a child seat anchoring structure S'" in accordance with a second embodiment will now be explained. In view of the similarity between the first and second embodiments, the parts of the child seat anchoring structure of the second embodiment that are identical to the parts of the first embodiment will be given the same reference numerals as the parts of the first embodiment. Moreover, the descriptions of the parts of the child seat anchoring structure of the second embodiment that are identical to the parts of the first embodiment may be omitted.

FIG. 8 shows the second embodiment of the present invention. Parts that are identical or equivalent to those in the previously described the first embodiment are indicated with the same reference symbols. In the second embodiment, the seat belt anchor 316 is a U-shaped member having a mounting part and a pair of side wall parts 316b provided so as to stand from both sides of the mounting part 316a. The mounting part 316a. is fixed to the vehicle body giving the member a generally U-shaped form in the frontal view.

The ends of the child seat fixing striker 23, which serves as the aforementioned attachment part, are fixed to both the side wall parts 316b so that the striker 23 bridges across the space between the two side wall parts 316b. The seat belt anchor 316 has a slit 316d formed as openings in each of the side wall parts 316b. The end parts 4a of webbings 4 are looped through these slits 316d so as to be fixed thereto.

Next, the operation of the child seat anchoring structure S'" of the second embodiment is explained. With the child seat anchoring structure S'" of the second embodiment, the slits 316d are formed as openings in the side wall parts 316b, which hold the child seat fixing striker 23. As a result, the seat belt webbings 4, which are fixed to the slits 316d, cannot easily enter the region between the slot 8a of the child seat locking part 8 and the child seat fixing striker 23.

As a result, the seat belt webbings 4 are prevented from getting caught when the child seat is installed. The other constituent features and operational effects are identical or equivalent to those of the first embodiment, and therefore, their explanation is omitted here.

Third Embodiment

Figure 9:
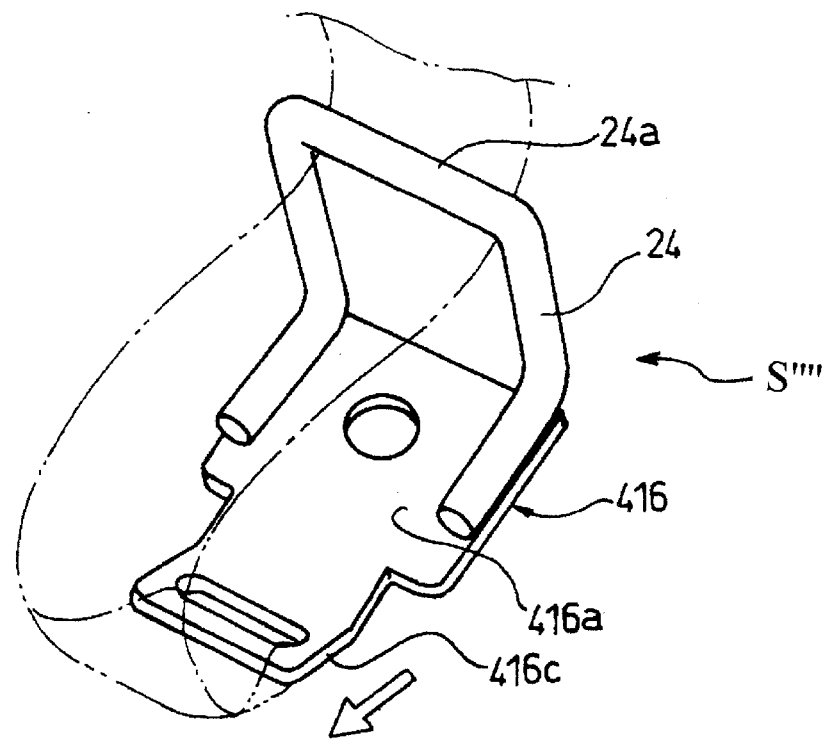
FIG. 9 is a perspective view of a modified seat belt anchor for a child seat anchoring structure of the third embodiment.
Figure 10:
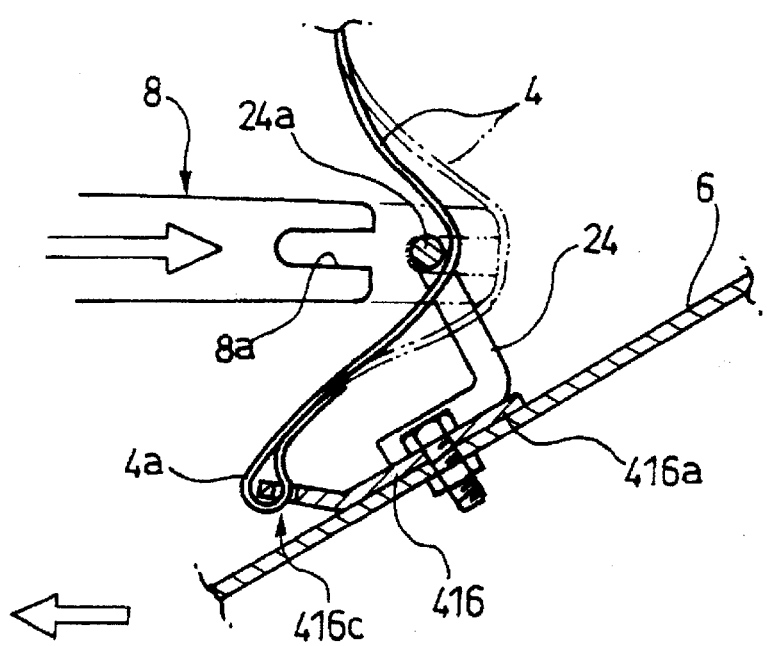
FIG. 10 is a partial cross sectional view of a modified seat belt anchor for a child seat anchoring structure in accordance with a third embodiment.

Referring now to FIGS. 9 and 10, a child seat anchoring structure S'''' in accordance with a third embodiment will now be explained. In view of the similarity between the first and third embodiments, the descriptions of the parts of the child seat anchoring structure of the third embodiment that are identical to the parts of the first embodiment may be omitted.

In the third embodiment, the seat belt anchor 416 is provided with the seat belt anchor part 416c positioned further toward the front of the vehicle than the child seat fixing striker 24. The child seat fixing striker 24 includes a rod-shaped attachment part 24a, which serves as the attachment part. The child seat fixing striker 24 extends in the transverse (substantially perpendicular) direction relative to the longitudinal direction of the vehicle, and the end parts 24b, which are welded to the mounting plate 416a of the seat belt anchor 416. This arrangement gives the striker 24 a generally gate-shaped form in the frontal view. The seat belt webbing 4 that extends from the seat belt anchor part 416c is passed under rod-shaped attachment part 24a and fed out toward the front of the vehicle. Thus, the rod-shaped attachment part 24a also serves as the wrap prevention means.

Next, the operation of the child seat anchoring structure S'''' of the third embodiment is explained. With the child seat anchoring structure S'''' of the third embodiment, the seat belt webbing 4, which extends from seat belt anchor part 416c of the seat belt anchor 416, is passed under rod-shaped attachment part 24 and fed out toward the front of the vehicle. Therefore, the webbing 4 is prevented from entering the region between the slot 8a and the rod-shaped attachment part 24a of the child seat fixing striker 24. As a result, the seat belt webbing 4 is prevented from getting caught.

While the first, second and third embodiments of the present invention have been explained based on the drawings, the specific constituent features of the invention are not limited to those of the first, second and third embodiments. Design changes that do not deviate from the gist of the present invention are encompassed by the present invention. For example, the left and right sides of the seat belt anchors 16 (which are provided generally symmetrically as a left-right pair with respect to one seat part) in the first embodiment (as shown in FIGS. 4 and 5) are shaped differently, but it is also acceptable to use a left-right pair of the seat belt anchors 16 whose left and right sides have generally the same shape. In such a case, increases in manufacturing cost can be held down because common components could be used.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2000-191278. The entire disclosure of Japanese Patent Application No. 2000-191278 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. Thus, the scope of the invention is not limited to the disclosed embodiments.

What is claimed is:

1. A child seat anchoring structure for installing a child seat into a vehicle body, comprising:

a seat belt anchor configured to receive a webbing of a seat belt;

a child seat attachment part arranged and configured to receive a locking part of the child seat by moving the child seat in a generally backward direction of the vehicle body so that the locking part approaches said child seat attachment part when mounted to the vehicle body; and a webbing guide part arranged and configured relative to said seat belt anchor and said child seat attachment part to prevent the webbing from entering a region in front of said child seat attachment part in which the locking part of the child seat is received when mounted to the vehicle body and the child seat is being installed on said child seat attachment part;

said seat belt anchor and said child seat attachment part being further arranged and configured to be fixedly coupled to the vehicle body.

2. A child seat anchoring structure as set forth in claim 1, wherein said seat belt anchor and said child seat attachment part are fixedly coupled together as an integrated unit and include a mounting part being arranged and configured to mount said seat belt anchor and said child seat attachment part to the vehicle body.

3. A child seat anchoring structure as set forth in claim 1, wherein said child seat attachment part includes a mounting part coupled thereto and a rod-shaped attachment part arranged to extend along a transverse direction of the vehicle body when mounted to the vehicle body, and said rod-shaped attachment part being separated by a height from said mounting part that is adapted to be fixed to the vehicle body; and said webbing guide part includes a webbing guide bar that is integral with and extend from said rod-shaped attachment part toward a front end of the vehicle body so that said webbing guide bar is located between said seat belt anchor and said rod-shaped attachment part when mounted to the vehicle body.

4. A child seat anchoring structure as set forth in claim 3, wherein said seat belt anchor and said child seat attachment part are fixedly coupled together as an integrated unit.

5. A child seat anchoring structure as set forth in claim 1, wherein said child seat attachment part includes a mounting part coupled thereto and a rod-shaped attachment part arranged to extend along a transverse direction of the vehicle body when mounted to the vehicle body, and said rod-shaped attachment part being separated by a height from said mounting part that is adapted to be fixed to the vehicle body; and said webbing guide part forming said seat belt anchor, said webbing guide part includes a webbing attachment rod-shaped part that is integral with and extend from the rod-shaped attachment part toward a front end of the vehicle body when mounted to the vehicle body.

6. A child seat anchoring structure as set forth in claim 5, further comprising:

a webbing movement preventing step part disposed between said rod-shaped attachment part and said webbing attachment rod-shaped part to connect said rod-shaped attachment part at a different height than said webbing attachment rod-shaped part relative to said mounting part.

7. A child seat anchoring structure as set forth in claim 6, wherein said webbing attachment rod-shaped part is located higher than said rod-shaped attachment part relative to said mounting part.

8. A child seat anchoring structure as set forth in claim 5, wherein said seat belt anchor and said child seat attachment part are fixedly coupled together as an integrated unit.

9. A child seat anchoring structure as set forth in claim 1, wherein said child seat attachment part is a child seat fixing striker fixed between two side wall parts that are adapted to be fixed to the vehicle body by a mounting part; and said seat belt anchor includes a slit formed in at least one of said side wall parts to allow the webbing to pass therethrough.

10. A child seat anchoring structure as set forth in claim 9, wherein said seat belt anchor and said child seat attachment part are fixedly coupled together as an integrated unit.

11. A child seat anchoring structure as set forth in claim 1, wherein said child seat attachment part includes a child seat fixing striker that is arranged to extend in a transverse direction of the vehicle body when mounted to the vehicle body, and said child seat fixing striker forming a webbing opening located in a rearward direction from said seat belt anchor relative to the vehicle body when mounted to the vehicle body such that said child seat attachment part forms said webbing guide part in that the webbing of the seat belt extends rearwardly from said seat belt anchor under said child seat attachment part, and then over said child seat fixing striker toward a front end of the vehicle body when the webbing of the seat belt is fixed to said seat belt anchor.

12. A child seat anchoring structure as set forth in claim 11, wherein said seat belt anchor and said child seat attachment part are fixedly coupled together as an integrated unit and include a mounting part being arranged and configured to mount said seat belt anchor and said child seat attachment part to the vehicle body.

13. A child seat anchoring structure as set forth in claim 1, wherein said seat belt anchor has a first slit for attaching the webbing thereto and a second slit for attaching an additional webbing of an additional seat belt thereto.

14. A child seat anchoring structure as set forth in claim 1, wherein said seat belt anchor includes first and second mounting parts overlying each other, said first mounting part having a portion with said first slit and said second mounting part having a portion with said second slit.

15. A child seat anchoring structure for installing a child seat into a vehicle body, comprising:

a seat belt anchor configured to receive a webbing of a seat belt;

a child seat attachment part arranged and configured to receive a locking part of the child seat by moving the child seat in a generally backward direction of the vehicle body so that the locking part approaches said child seat attachment part when mounted to the vehicle body; and a wrap prevention means, operatively disposed relative to said seat belt anchor and said child seat attachment part, for preventing the webbing from entering a region in front of said child seat attachment part in which the locking part of the child seat is received when mounted to the vehicle body and the child seat is being installed, said seat belt anchor and said child seat attachment part being further arranged and configured to be fixedly coupled to the vehicle body.

* * * * *